Patented Feb. 10, 1931

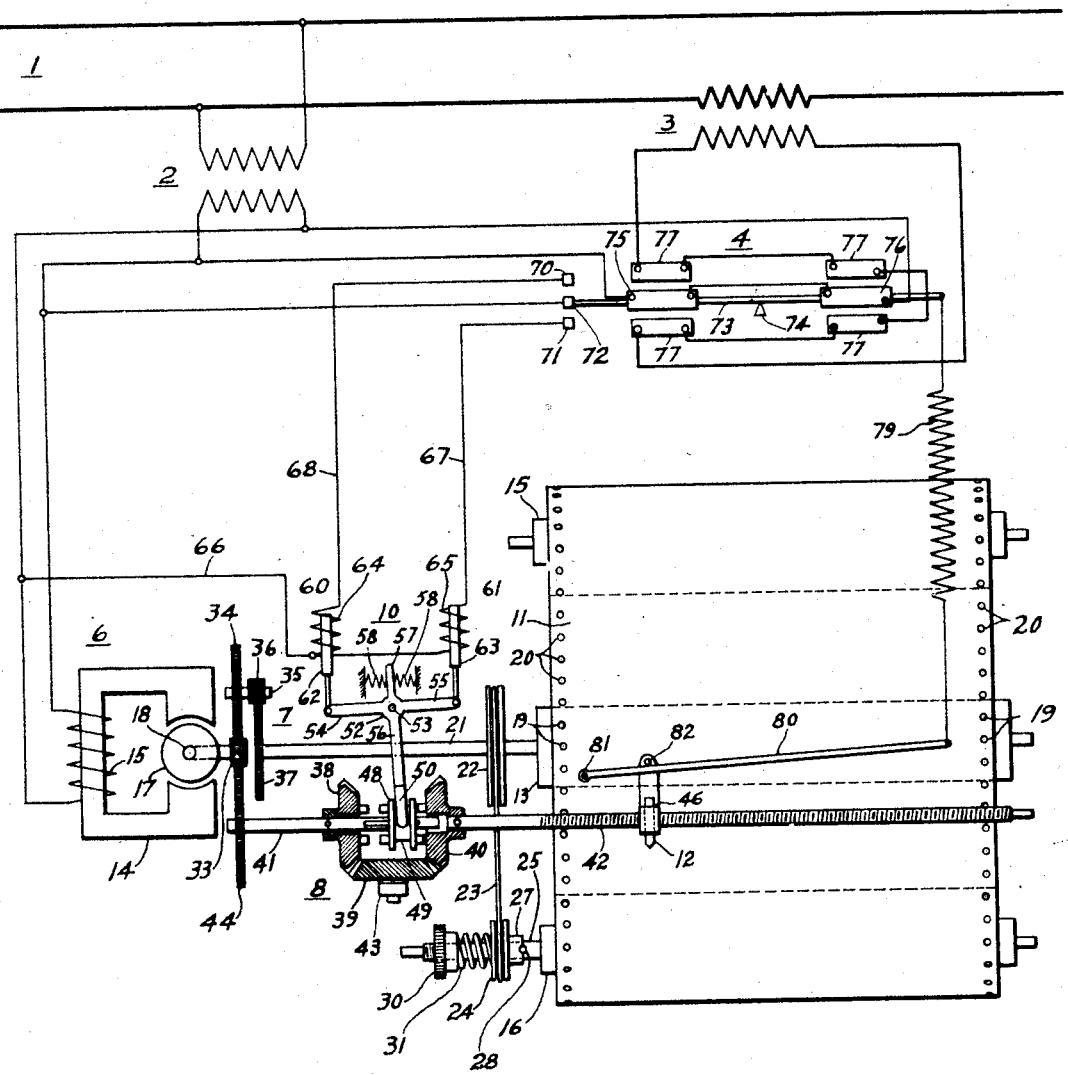

1,792,319

UNITED STATES PATENT OFFICE

THOMAS S. PERKINS, OF IRWIN, PENNSYLVANIA, ASSIGNOR TO WESTINGHOUSE ELECTRIC & MANUFACTURING COMPANY, A CORPORATION OF PENNSYLVANIA

GRAPHIC METER

Application filed September 23, 1924. Serial No. 739,245.

My invention relates to graphic meters and particularly to electrical recording meters of the relay type.

One object of my invention is to provide a meter, of the above-indicated character, that shall be simple and durable in construction, economical to manufacture and effective in its operation.

Another object of my invention is to provide a graphic meter in which a time-controlled element and a quantity-responsive element shall be driven by a single motive device.

Another object of my invention is to provide a graphic meter in which both the chart and the stylus shall be driven and controlled by energy derived from the circuit being measured.

Heretofore, it has been usual to drive the chart of a graphic meter by a clock or similar time-controlled motive device and to drive the stylus by an electric motor, known as a pilot motor, that is controlled by a relay of the Kelvin-balance type and usually energized from a battery or other auxiliary source of electromotive force. Thus, the requirement for two separate and independent motive devices and an auxiliary circuit rendered the meter relatively complicated and expensive.

It is my aim to overcome the above-mentioned objectionable feature and to very materially simplify the construction and operation of graphic meters of this type by eliminating one of the motive devices and the auxiliary circuit.

Accordingly, in practicing my invention, I provide a synchronous motor, preferably driven from the circuit to be measured, that is directly coupled with the meter chart to drive the same and that is connected, through a reversing mechanism, to the stylus to drive the latter in opposite directions. A relay or Kelvin balance so controls the reversing mechanism as to cause the stylus to move in accordance with the quantity of the circuit being measured.

The single figure of the accompanying drawing is a diagrammatic view of a recording meter embodying my invention.

The device comprises, in general, a circuit 1 of which a measurement is desired, a voltage transformer 2, a current transformer 3, a Kelvin-balance relay 4, a synchronous motor 6, a reduction gear mechanism 7, a reversing gear mechanism 8, an actuating device 10 for the mechanism 8, a chart 11 and a stylus 12.

The motor 6 comprises a field-magnet core 14, a field-magnet winding 15 that is connected across the voltage transformer 2, an armature 17 and an armature shaft 18 that is connected to the gear mechanism 7.

The chart 11, that is initially wound on an idler supply roller 15, is adapted to be transferred from the roller 15 to a take-up roller 16 by a feed roller 13 having pins 19 that register with marginal openings 20 in the chart, in a usual and well-known manner.

The take-up roller 16 is driven from the feed roller shaft 21 through a pulley 22 on the shaft 21, a belt 23 and a smaller pulley 24 loosely mounted on the shaft 25 of the take-up roller 16.

The pulley 24 has a notched collar portion 27 that functions as a slip-clutch member, the cooperating clutch member being a pin 28 fixed to the shaft 25 of the take-up roller 16. The tension between the cooperating clutch members 27 and 28 is adjusted by a nut 30 that is mounted on the shaft 25 and has a screw-thread engagement therewith to adapt it to compress a spring 31 that surrounds the shaft 25 between it and the pulley 24.

The reduction-gear mechanism 7 comprises a pinion 33 on the armature shaft 18 of the motor 6, a gear wheel 34 on a shaft 35 that also carries a pinion 36, and a gear wheel 37 that is mounted on the feed-roller shaft 21 and is engaged by the pinion 36.

The reversing gear mechanism 8 comprises differential miter gear wheels 38, 39 and 40, the outside wheels 38 and 40 of which are respectively attached to shafts 41 and 42, and the intermediate wheel 39 of which is mounted in a stationary bearing member 43.

The shaft 41 carries a gear wheel 44 for engagement with the pinion 33 on the armature shaft 18. The shaft 42 constitutes a worm screw upon which is mounted a traveling nut 46 carrying the stylus 12.

A collar 48, that is feathered to the shaft 41 for longitudinal sliding movement thereon, is provided with a central perimetral groove 49 for the reception of a yoke 50 and also with end surfaces constructed as clutch surfaces for cooperation with similar surfaces on the inner faces of the gear wheels 38 and 40.

The actuating mechanism 10 for the reversing gear mechanism 8 comprises a lever member 52 that is pivotally mounted on a pin 53 and embodies substantially horizontal arms 54 and 55 that pivot about the pin 53 similar to a walking beam structure. A depending arm 56 of the lever 52 carries the yoke 50, preferably integrally formed thereon. An upwardly projecting arm 57 of the lever 52 cooperates with springs 58 for centering the lever and, consequently, the clutch collar 48 in its neutral or mid position, under certain conditions.

The device 10 further comprises actuating magnets 60 and 61 embodying movable core members 62 and 63 that are connected to the arms 54 and 55, respectively, and coils 64 and 65 for the core members 62 and 63, respectively. The coils 64 and 65 are connected, by a common conductor 66, to one terminal of the voltage transformer 2 and by leads 68 and 69 to stationary contact members 70 and 71 that cooperate with a movable contact member 72. The latter is connected to the other terminal of the voltage transformer 2 and is carried by the movable element 73 of the Kelvin balance 4. The movable element 73 is fulcrumed on a member 74 and carries coils 75 and 76 that are connected in series with each other across the voltage transformer 2.

Stationary coils 77 are connected in series with the current transformer 3 and thereby cooperate with the voltage coils 75 and 76 to actuate the element 73 in accordance with the power traversing the circuit 1, as in usual practice. The element 73 may be caused to move in accordance with the volts, the amperes or other quantities, depending upon the manner of connecting the coils 75, 76 and 77.

A spring 79 is connected between the movable element 73 of the Kelvin balance and a cam lever 80 that is pivotally mounted on a stationary pivot pin 81. A roller or cam member 82, carried by the traveling nut 46, depresses the lever 80 and, consequently, tensions the spring 79 against the movement of the element 73 in accordance with usual practice.

It is to be understood that the parts illustrated are merely representative of suitable means for effecting the results sought and may be variously modified within the scope of the invention.

In operation, since it is desired, in this instance, to measure or record the energy traversing the circuit 1 which is adjusted for frequency, the motor 6 is caused to operate at a relatively high speed. This operation moves portions of the chart 11 from the supply roller 15 to the take-up roller 16 by the feed roller 13 that is actuated directly from the motor 6 through the shaft 18, the pinion 33, the gear wheel 34, the shaft 35, the pinion 36, the gear wheel 37 and the shaft 21. This movement is transmitted to the take-up roller 16 through the pulley 22, the belt 23, the pulley 24, the slip-clutch members 27 and 28 and the shaft 25. The slip-clutch mechanism is provided to compensate for the changing diameter of the chart material on the take-up roller and to keep the chart at proper tension for cooperation with the stylus 12 between the feed-roller 13 and the take-up roller 16. This construction has been suggested before and, therefore, constitutes, specifically, no part of my present invention.

When the power traversing the circuit 1 is constant, the stylus 12 is stationary, and the forces between the stationary and movable coils of the Kelvin balance are exactly balanced by the tension of the spring 79. Consequently, the movable contact member 72 is in its mid position and out of engagement with both of the stationary contact members 70 and 71. Under these conditions, the coils 64 and 65 of the magnets 60 and 61 are both deenergized and the lever 52 is held in its neutral position by the springs 58. Under these conditions, also, the clutch collar 48 engages neither of the gear wheels 38 and 40, and the shaft 42 is, therefore, stationary, as presumed from the beginning of the description of this cycle of the operation of the device.

Upon the occurrence of a change in the value of the power in the circuit 1, the coacting forces between the stationary and the movable coils of the Kelvin balance will change and, consequently, the springs 79 will either relax to permit the movable element 73 to move in one direction about its fulcrum or will overcome the forces between the coils to move the element 73 in the other direction. In either case, the contact member 72 will engage the one or the other of the stationary contact members 70 and 71 to complete a circuit through the one or the other of the coils 64 and 65 across the terminals of the voltage transformer 2.

When the contact member 72 engages the contact member 71, the above-mentioned circuit is completed through the coil 65 to move the lever 52 in the counterclockwise direction, as viewed in the drawing, to cause the clutch collar 48 to engage the gear wheel 40, as shown. This operation causes movement of the armature 17 to be transmitted in one direction to the shaft 42 through the shaft 18, the pinion 33, the gear wheel 44, the shaft 41, the collar 48 and the gear wheel 40. Thus, the stylus 12 will take up a new position corresponding to the value of the power traversing the circuit 1. In taking this position, the cam 82 will be moved on the lever 80 to change the tension in the spring 79 and to, thereby, again balance the element 73 in its mid position and to disengage the contact member 72 from the contact member 71.

When the value of the power in the circuit 1 changes oppositely to that assumed above, the contact member 72 engages the contact member 70 to complete a circuit from the voltage transformer 2 through the coil 64. This operation causes the collar 48 to engage the gear wheel 38 to transmit the movement of the shaft 41 in the opposite direction to the shaft 42 through the gear wheels 39 and 40.

By my invention, the trouble and expense connected with the operation of two motive devices are eliminated, the instrument is rendered simple and compact in construction, and, in general, a more desirable and effective mechanism for recording purposes is provided.

While I have shown and described a particular form of my invention, changes may be effected therein without departing from the spirit and scope thereof, as set forth in the appended claims.

I claim as my invention:

1. In combination, in an electrical device, relatively movable cooperating elements, electro-responsive means for driving said elements at constant speed, means for causing one of said elements to be responsive to operation of said driving means to move in one direction and another of said elements to be responsive to the same operation of said driving means to move in reverse directions, and means energized from the same circuit as said driving means to control the direction, distance and time of operation of said other element in accordance with variations of a quantity of said circuit.

2. In combination, in an electrical device, relatively movable cooperating elements, electro-responsive means for driving the same at constant speed, means for causing one of said elements to be responsive to operation of said driving means to move in one direction and another of said elements to be responsive to the same operation of said driving means to move in reverse directions including reversing means for connecting said other element to, and disconnecting the same from, said driving means, and an electrical relay energized by the same circuit as said driving means for actuating said reversing means to control the direction, distance and time of operation of said other element in accordance with variations of a quanity of said circuit.

3. In combination, in an electrical device, relatively movable cooperating elements, electro-responsive means for driving the same at constant speed, means for causing one of said elements to be responsive to operation of said driving means to move in one direction and another of said elements to be responsive to the same operation of said driving means to move in reverse directions including a circuit interrupter, electro-responsive means energized from the same circuit as said driving means for connecting said other element to, and disconnecting the same from, said driving means, and an electrical relay energized by the same circuit as said driving means and connected to said connecting means through said circuit interrupter for actuating said reversing means to control the direction, distance and time of operation of said other element in accordance with variations of a quantity of said circuit.

4. In combination, in a graphic meter, a movable record-chart element, a movable element for effecting a record thereon, means for driving both of said elements at constant speed, means for causing one of said elements to be responsive to operation of said driving means to move in one direction and the other element to be responsive to the same operation of said driving means to move in reverse directions including reversing means for connecting said other element to, and disconnecting the same from, said driving means, and means for actuating said reversing means to control the direction, distance and time of operation of said other element in accordance with variations in the values of a quantity being measured.

5. In a combination, in a graphic meter, a movable record-chart element, a movable element for effecting a record thereon, constant-speed driving means for said elements, means for causing said elements to move at different constant speeds, means for causing one of said elements to be responsive to operation of said driving means to move in one direction and the other element to be responsive to the same operation of said driving means to move in reverse directions including reversing means for connecting said other element to, and disconnecting the same from, said driving means, and means for actuating said reversing means to control the direction, distance and time of operation of said other element in accordance with variations in the values of a quantity being measured.

In testimony whereof, I have hereunto subscribed my name this 17th day of September, 1924.

THOMAS S. PERKINS.